United States Patent [19]

Rothe et al.

[11] Patent Number: 5,558,389
[45] Date of Patent: Sep. 24, 1996

[54] RETRACTABLE FOLDING TOP FOR A CONVERTIBLE

[75] Inventors: Karl Rothe, Bramsche; Frank Lehnig; Heiko Klemme, both of Osnabrueck, all of Germany

[73] Assignee: Wilhelm Karmann GmbH, Osnabrueck, Germany

[21] Appl. No.: 287,443

[22] Filed: Aug. 8, 1994

[30]     Foreign Application Priority Data

Aug. 7, 1993 [DE]   Germany ............................ 9311798 U

[51] Int. Cl.[6] ..................................................... B60J 7/12
[52] U.S. Cl. ............................ 296/107; 296/117; 296/136
[58] Field of Search ..................................... 296/136, 107, 296/116, 117, 121

[56]                 References Cited

U.S. PATENT DOCUMENTS 5,067,768  11/1991  Fischbach ................................ 296/107
5,267,769  12/1993  Bonné et al. ......................... 296/136 X

*Primary Examiner*—Andrew C. Pike
*Attorney, Agent, or Firm*—Jordan and Hamburg

[57]                 ABSTRACT

A convertible top for a vehicle includes a folding top frame having top-folded and top-unfolded positions, a storage well in the vehicle, a cover for the storage well, and an actuator operably connected between the cover and the vehicle for moving the cover between a closed position and an open position. The cover when in its closed position covers the storage well, and when in its open position uncovers the storage well. Lockably engageable parts on the cover and the folding top frame are operable to effect locking engagement between the cover and the folding top frame. The actuator includes a cross strut mounted on the cover and having a helical-like groove, and a reversing lever pivotally mounted to the vehicle and having a thrust pin disposed in the groove such that pivoting of the reversing lever rotates the cross strut. The actuator is operable to move the cover in a non-circular path to its closed position as the engagement is effected between the cover and the folding top frame by the engageable parts such that moving of the cover to its closed position by the actuator effects tensioning of the folding top frame.

23 Claims, 10 Drawing Sheets

RETRACTABLE FOLDING TOP FOR A CONVERTIBLE

BACKGROUND OF THE INVENTION

This invention relates to a retractable folding top for a convertible.

In the case of known folding tops for convertibles, the folding top, which is provided with a tightening clamp for the material of the top in the rear region, is locked in the closed position in its resting position on the cover for the storage well of the top, in each case a locking pin interacting with a forked torsion latch of a torsion latch lock and the cover for the storage well of the top being pivotable by means of a hydraulic driving mechanism into the opening and closing positions. The hydraulic driving cylinders, provided for this purpose as driving elements, are accommodated in the body region below the fender or the rear flap, so that the construction costs, as well as the space required, are disadvantageously increased and solutions of this type are not very suitable, especially for 4-seater convertibles.

SUMMARY OF THE INVENTION

It is an object of the invention to provide a retractable folding top for a convertible, the driving elements of which, disposed movably and in a space-saving manner with little technical effort, enable the folding top to be fixed carefully and reliably tight on the cover for the storage well of the top.

With the inventive construction of the retractable folding top with the actuating apparatus that can be used for jointly moving the tightening clamp for the material of the top and the cover for the storage well of the top, an effective connection of these components is possible with little constructive effort in such a way, that a simplification of the locking means, as well as, with little effort, an automatic control of the locking and unlocking of the tightening clamp for the material of the top and of the cover for the storage well of the top can be achieved.

With the actuating equipment, a pivoting/pushing motion can be imparted during the closing process to the cover of the storage well for the top. With this motion and the simultaneous connecting engagement of closing part and locking equipment, a material-safeguarding, uniform tension can be imparted to the material of the folding top, so that, in the closed state, the folding top offers a fold-free, smooth roofing contour, which makes a decrease in driving noise possible.

The actuating equipment, which can be driven with little effort, can be provided with a driving unit of small construction, so that such a folding top can be used advantageously for 4-seater convertibles with confined space relationships in the rear region of the vehicle.

Further details and advantages of the invention arise out of the following description and the drawing, which illustrates an embodiment of an inventive, retractable folding top diagrammatically.

In the Drawings

FIG. 1 shows a partially opened up rear view of a convertible with a folding top in the closed position, FIG. 2 shows a side view of the rear region along a line II—II of FIG. 1, FIG. 3 shows a rear view, similar to that of FIG. 1, with a cover for a storage well of a top in the open position, FIG. 4 shows a perspective view similar to that of FIG. 3, with a cover for storage well of a top and a folding top interacting in a closing phase, FIG. 5 shows a sectional side view of the rear region along a line V—V of FIG. 4, FIG. 6 shows a perspective detailed representation of a reversing lever, which is provided at the cover for the storage well of a top, FIG. 7 shows a perspective view of the reversing lever, FIG. 8 shows a perspective detailed representation of a parallelogram hinge, which is provided between the cover for a storage well of the top and the vehicle body, FIG. 9 shows a perspective detailed representation of locking equipment with a closing pans, and FIG. 10 shows a side view of a catch hook engaging an anchoring bracket.

DESCRIPTION OF THE PREFERRED EMBODIMENT

Figure 1:
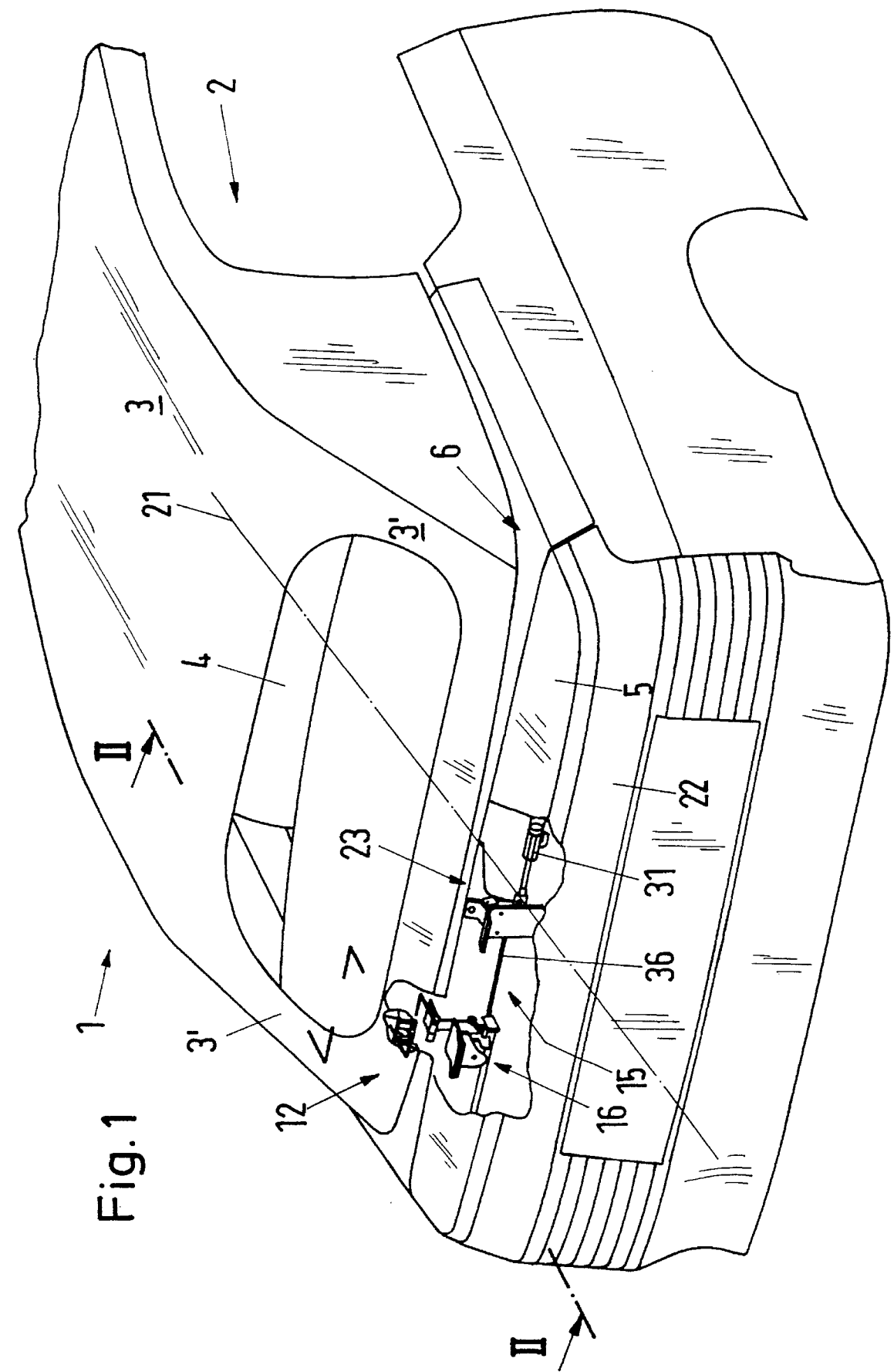

In FIG. 1, a rear region of a convertible is illustrated, which is labeled 1 as a whole, and the closed folding top 2 which has a rear window 4 integrated in the roofing 3, below which rear window 4 the folding top 2 is put down in a storage well having a cover 6, which is in one plane with the trunk lid 5.

Figure 2:
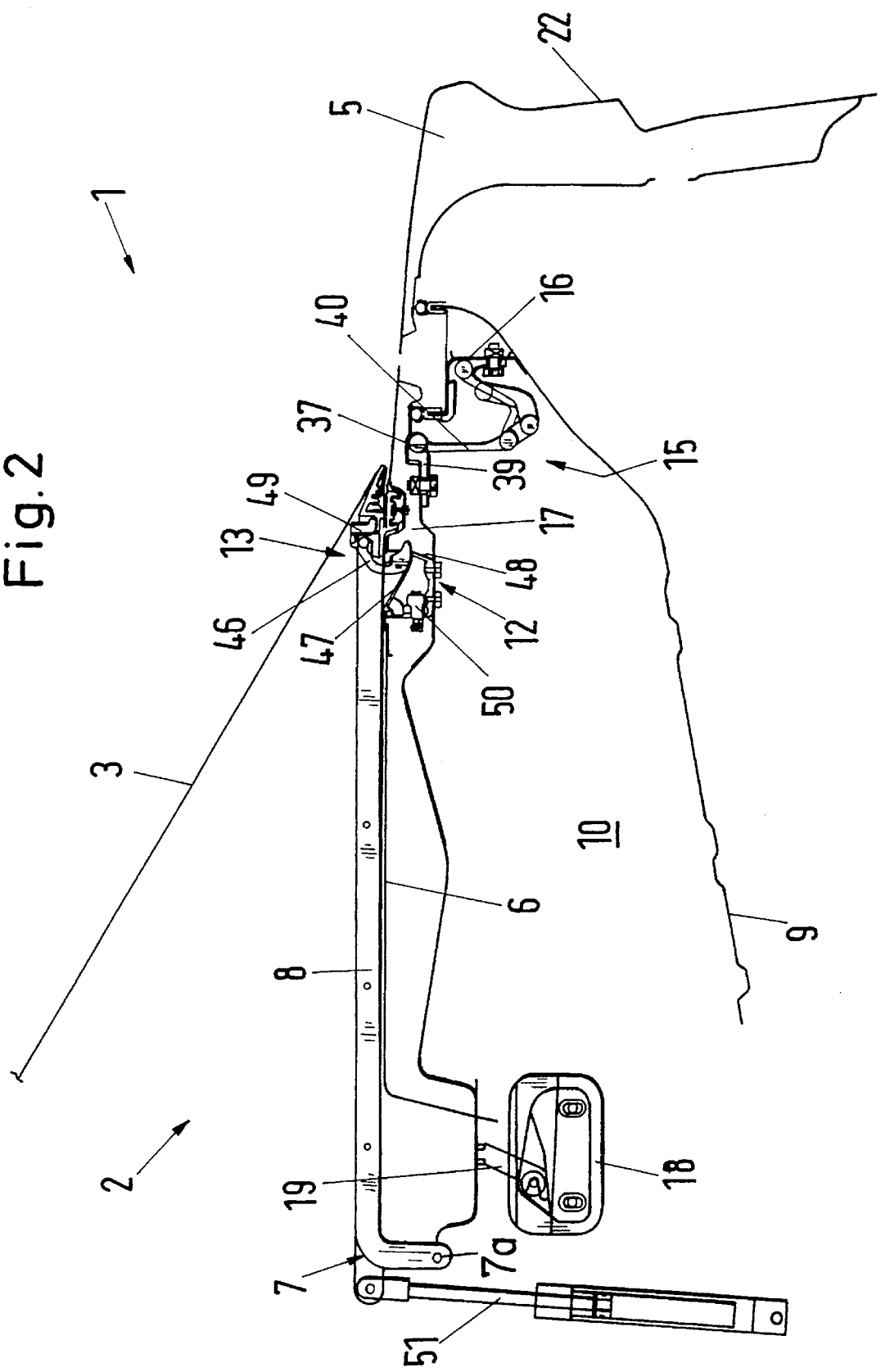

The sectional side vide of FIG. 2, when viewed in conjunction with FIG. 1, illustrates that the folding top 2 is provided with a frame 7, the rear termination of which is formed by a U-shaped tightening clamp 8 for the top and which is pivotably supported on the vehicle at 7a. Below a supporting plane formed by the cover 6 there is provided trough 9 which forms, a storage well 10 for the top into which the folded top 2 can be swiveled when the convertible is driven with the top down (not shown). For this purpose, the cover 6 for the storage well of the top in the closed position (FIG. 1), after the folding top 2 is lifted up, is swiveled into an open position (FIG. 3), the folded top 2 is placed in the storage well 10 and then covered by means of the storage well cover 6 for the storage well of the top.

If subsequently the convertible is used in the closed position (with the top up), the reverse of the sequence described above for the folding process is followed and the cover 6 for the storage well of the top is opened, the folded top 2 is swiveled out by means of the frame 7, brought into the closed position (FIG. 1) adjoining, on one side, the windshield frame (not shown) and, in this closed position, the folding top 2 is fixed over at least one closing part 13 at the tightening clamp 8 of the top and engaging the respective locking device 12 in the resting position on the cover 6 for the storage well of the top (FIG. 2). The closing part 13 and the locking equipment 12 together are sometimes hereinafter referred to as engageable means.

Partially broken away, sectional representation of FIG. 1 illustrates that the cover 6 for the storage well of the top is provided for these automatic motions in an advantageous development with actuating equipment, which is labeled 15 as a whole and which is described in greater detail hereinafter. During the closing process. The actuating equipment 15 brings about in the region of the respective pivoting mountings 16 hereinafter further described, a horizontal control motion at least in phases in such a manner, that the closing part 13 is taken hold of at the tightening clamp 8 for the material of the top by the locking equipment 12 (FIG. 5) and the folding top 2 is moved with a pretension into the resting position (FIG. 1).

Figure 3:
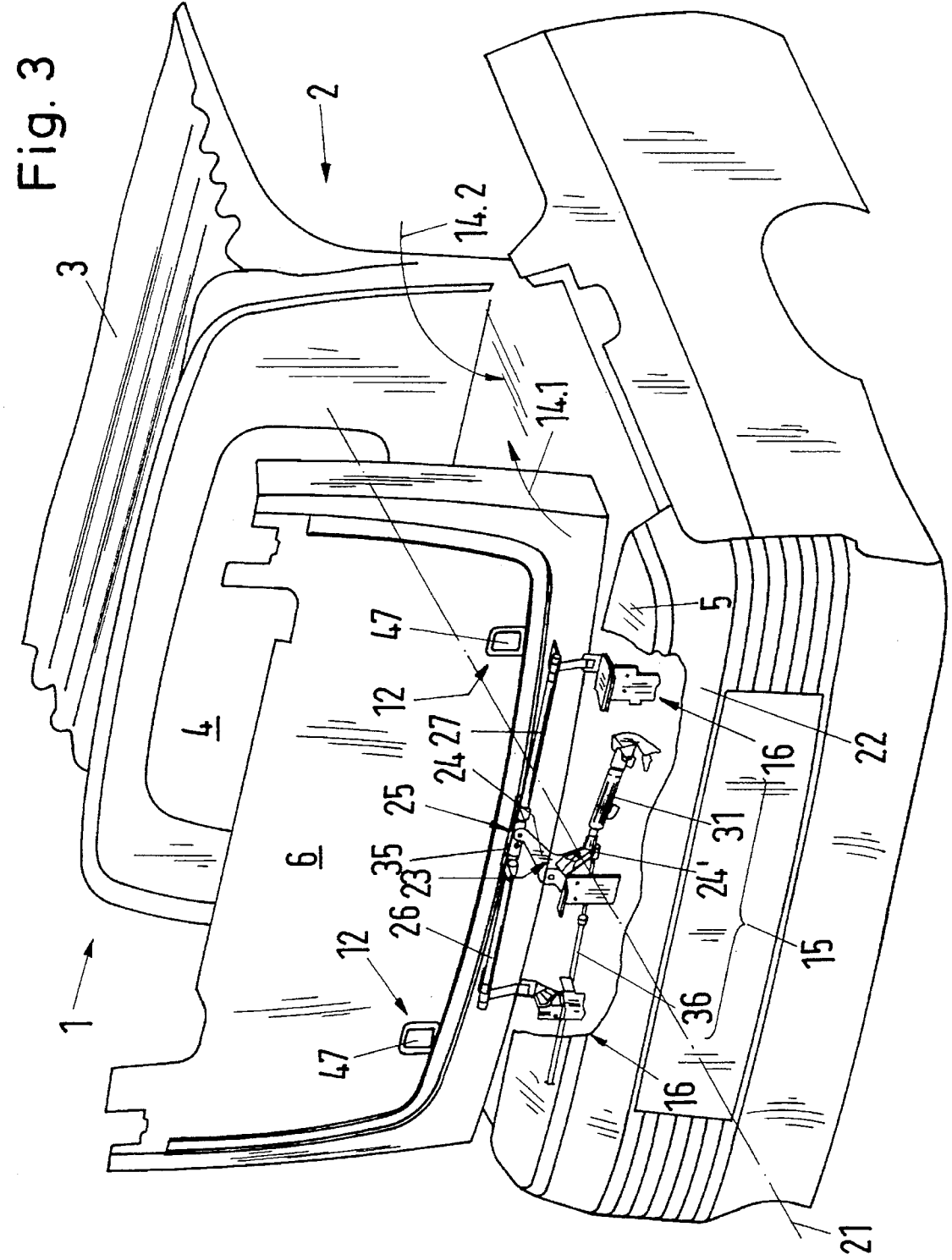
Figure 4:
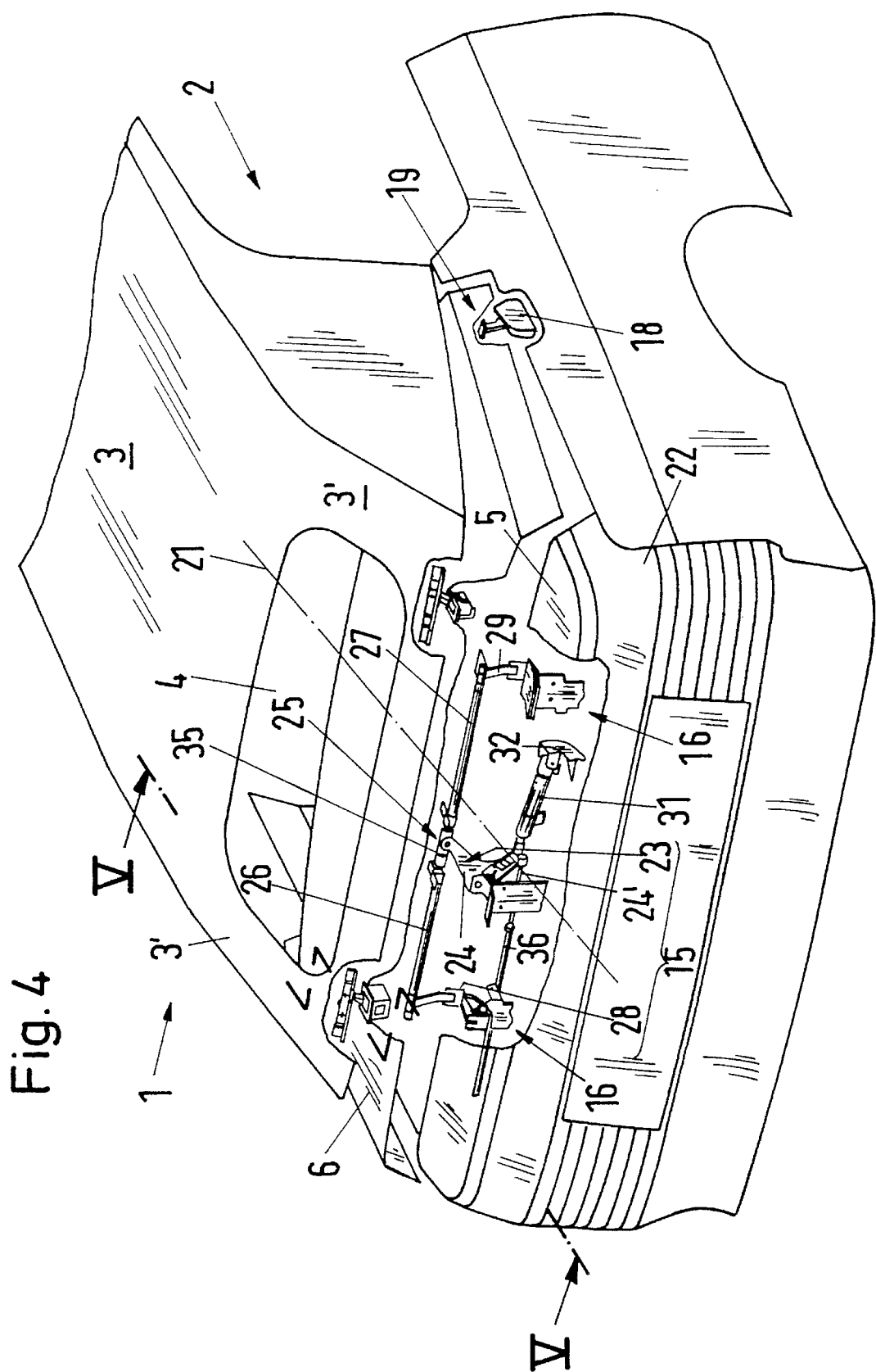

The respective motion phases in FIGS. 3 and FIG. 4 make it clear that, on the one hand, the cover 6 for the storage well of the top is pivoted in the arrow direction 14.1 by means of the actuating equipment 15 and, on the other, the folding top 2 is pivoted at 7a by means of the frame 7 for the top in the arrow direction 14.2 during the closing process in such a manner, that the closing part 13 reaches a flap position crossing the path of motion of the locking equipment 12 (FIG. 5), in which the closing part 13 is taken hold of in a well or snap-in opening 17 by the locking equipment 12 and, in this locking position, the folding top 2 and the cover 6 for the storage well of the top can be brought jointly by means of a pivoting/pushing motion into the resting position in which the material 3 of the top is stretched.

With this relationship of the components of the frame 7 and the cover 6 for the storage well of the top, the convertible 1 overall has a fold-free and smooth outer contour in the region of the roof 3 (FIG. 1) and, in the closed state, extensive noise reduction is achievable at high driving speeds. The rear window 4 can be integrated in a fixed and heatable form in the rear region of the roofing 3 so that an advantageously slightly limited field of view is formed only in narrow edge regions 3'.

Figure 5:
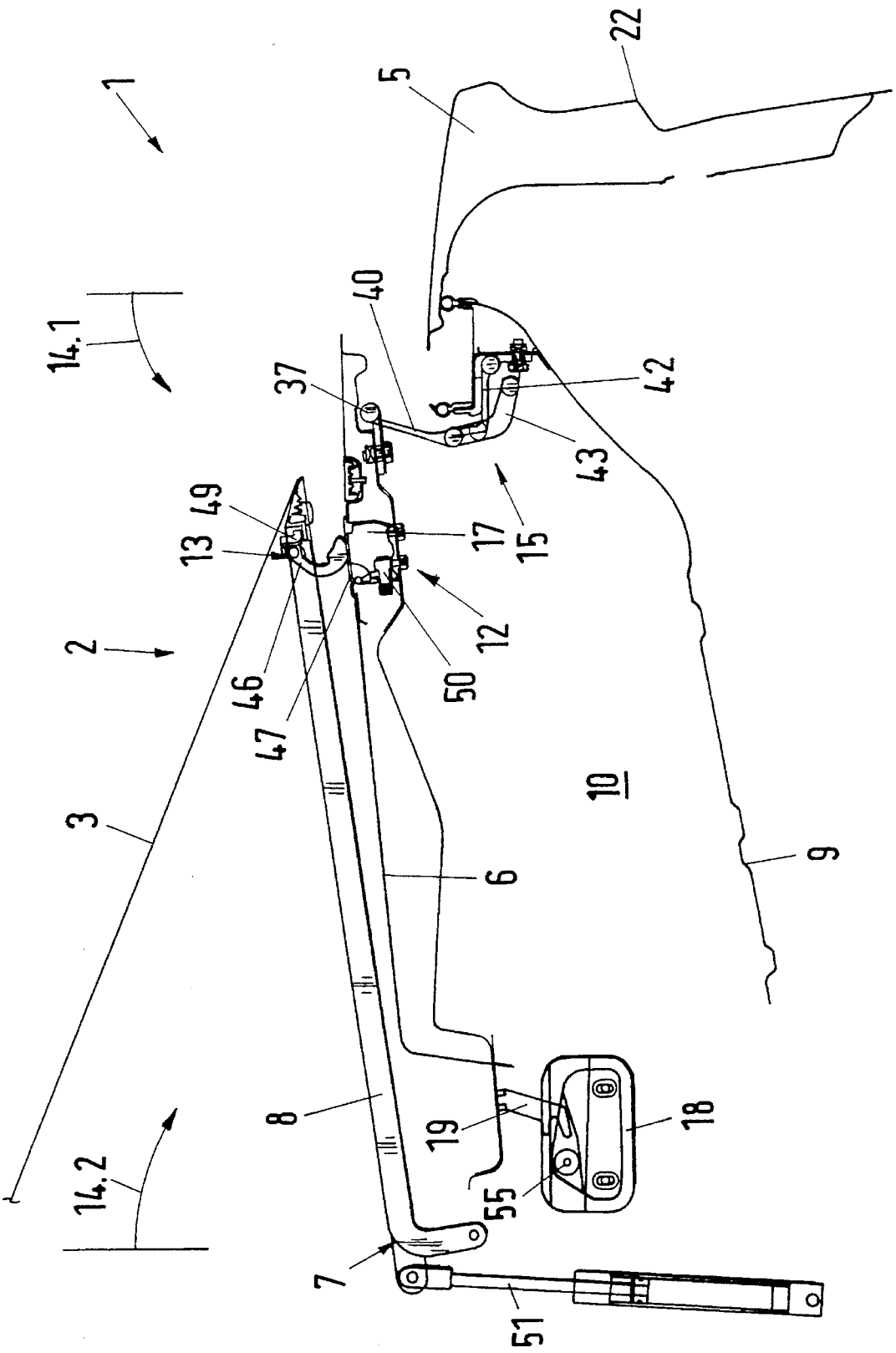

The side views of FIGS. 2 and 5 illustrate that the cover 6 for the storage well of the top is provided with two catch hooks 19 hereinafter sometimes referred to as catch means, which are disposed at the front edge regions of the cover 6 symmetrically to the longitudinal axis 21 of the vehicle and, engage in each case one anchoring bracket 18 held in the body of the vehicle. With these catch means 19, a further stabilization of the cover 6 for the storage well of the top is achieved in addition to the locking formed in the region of the locking equipment 12 and the closing part 13 and the tightness in the supporting region of the tightening clamp 8 for the top on the cover 6 for the storage well of the top being assured even at high driving speeds.

The partially broken away representation of the rear region of FIG. 4 illustrates that the actuating equipment 15 or actuating means is provided with a reversing lever 23, which is supported on the inside in the region of the longitudinal axis 21 of the vehicle at the rear 22 of the vehicle body and has at a first free leg 24 and a connecting element 25, which is directed to the cover for the storage well of the top and is connected over cross struts 26, 27 extending in each case perpendicularly to the longitudinal axis 21 with parallelogram hinges 28, 29, which, on the one side, are braced at the edge of the rear 22 of the vehicle body and, on the other, hold the cover 6 of the storage well for the top.

In an appropriate embodiment, the reversing lever 23 is provided in the region of its second free leg 24' with a driving element 31, which is constructed as a hydraulic cylinder 31, held on one side by means of a supporting part 32 at the rear 22 of the vehicle body and linked at the other side to a transmission lever 33 (FIG. 6) in such a manner that movement can be initiated in the reversing lever 23 by means of this transmission lever 33. The range of movement of the transmission lever 33 is limited by a stop 34.

Figure 7:
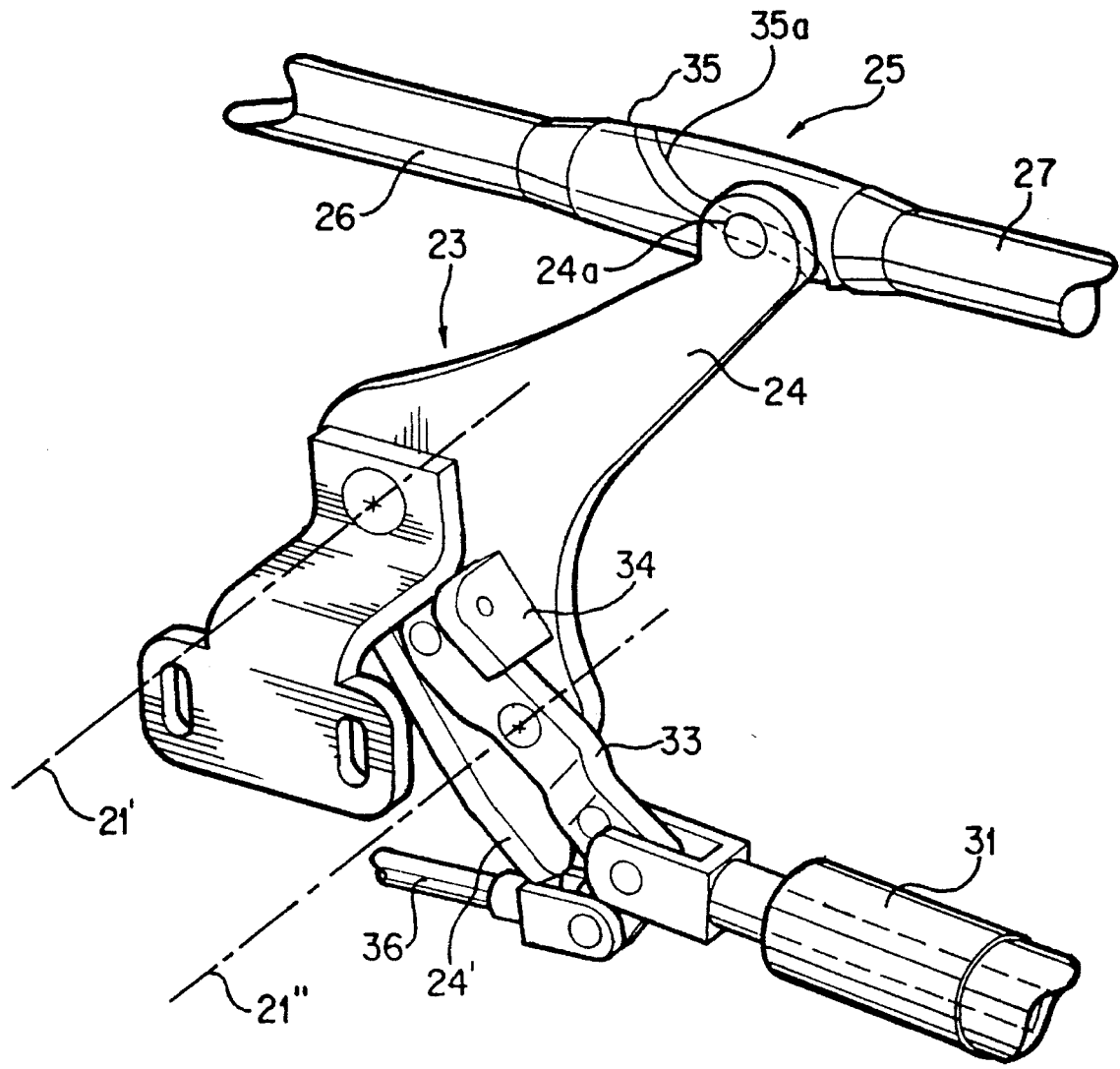

In the region of the connecting element 25, the reversing lever 23, in an appropriate embodiment as shown in FIG. 7, has a thrust bolt 24a, guided in a groove 35a, as sliding pairing parts 35, with which, when motion is initiated, a reversible rotary motion can be imparted to the two cross struts 26, 27 and thus, at the same time, an automatic opening and closing motion of the cover 6 for the storage well of the top is attainable. Thus, during pivoting of the reversing lever 24, the thrust bolt 24a is guided in the groove 35a so that the two cross struts 26, 27 are rotated about their longitudinal axes, the reversing lever 24 is pivotable on the vehicle about axis 21' which is parallel to the longitudinal axis of the vehicle, and the transmission lever 33 is pivotable about an axis 21" parallel to the longitudinal axis of the vehicle.

Figure 6:
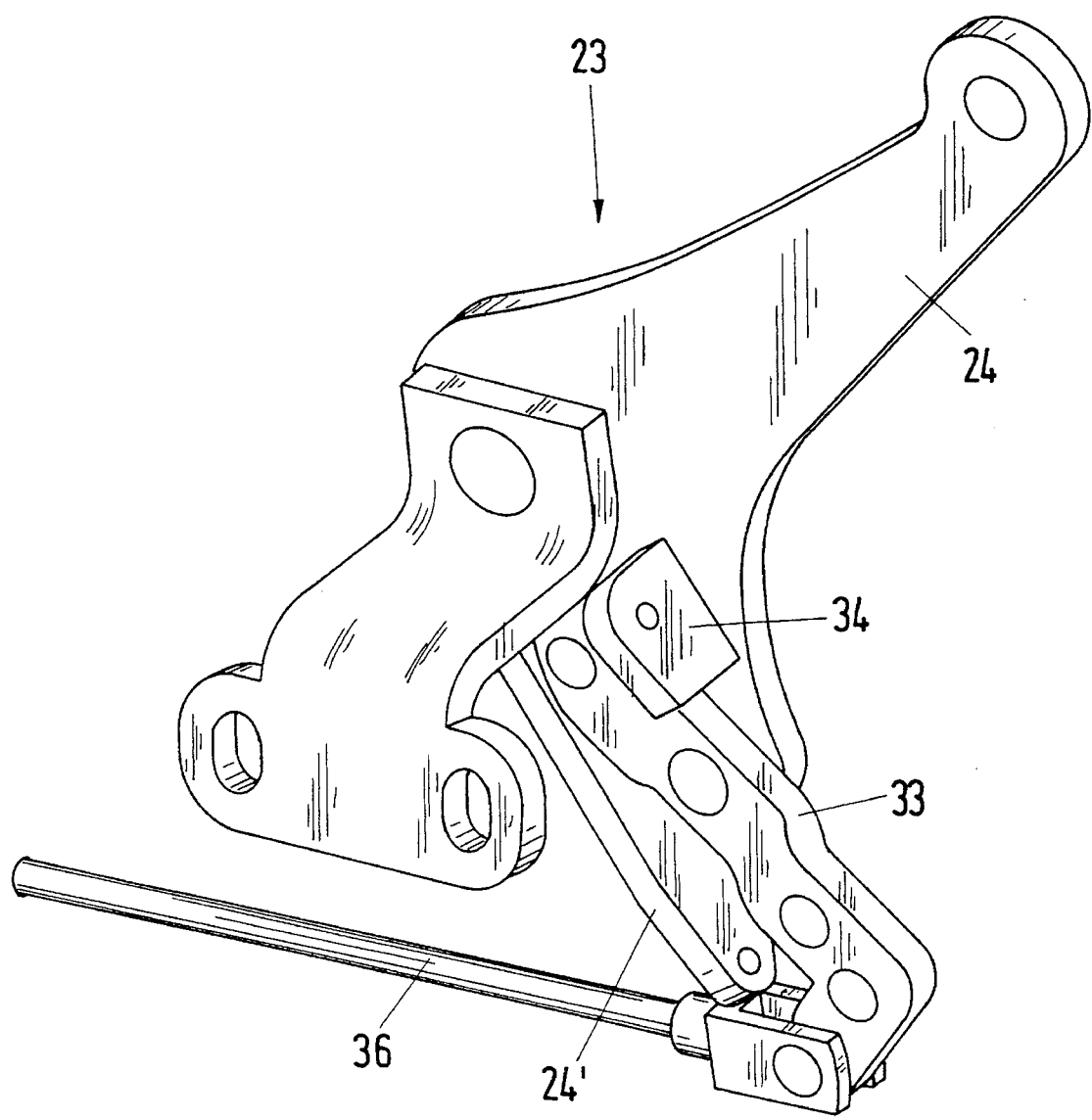

The enlarged detailed representation of the reversing lever 23 of FIG. 6 illustrates that, for initiating the motion, a Bowden wire 36, with which, at the same time, an emergency locking of the components can be achieved, can also be provided on the transmission lever 33. Likewise, it is conceivable that the Bowden wire 36 may be provided at the other end with a driving element (not shown), which can be disposed, to save space, in the side region of the body of the vehicle. In FIG. 7 the hydraulic cylinder 31 is shown pivotably connected to the transmission lever 33 such that when the hydraulic cylinder 31 is operated, the transmission lever 33 is pivoted about axis 21" and moved against the stop 34, whereby the reversing lever 24 is pivoted. FIG. 7 also shows the Bowden wire 36 connected to the transmission lever. Alternatively either the hydraulic cylinder 31 may be used alone or the Bowden wire 36 may be used alone.

Figure 8:
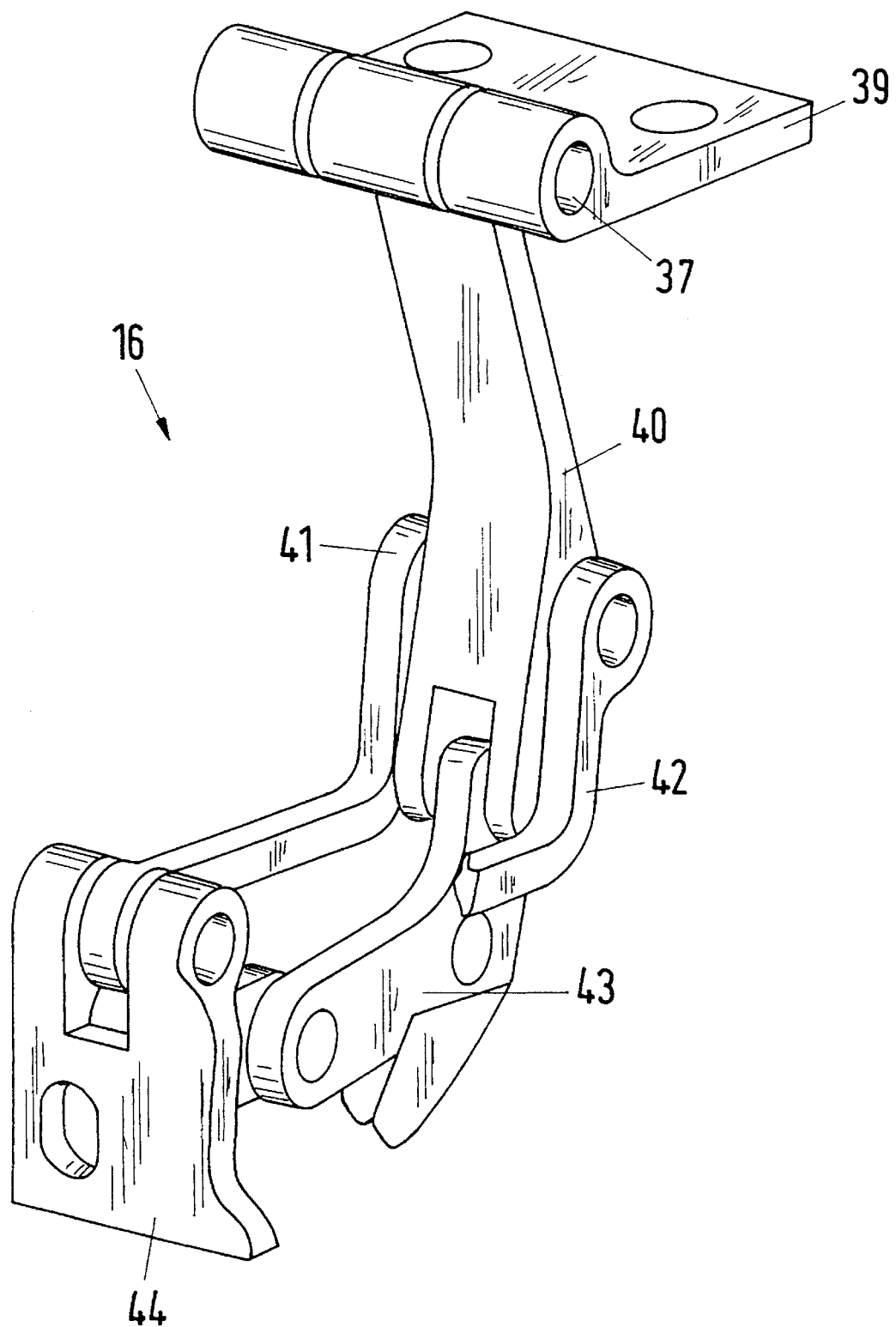

The adjusting motion for the cover 6 for the storage well of the top, initiated over the sliding pairing parts 35 in the region of the connecting element 25, is transferred over the cross struts 26, 27 to the parallelogram hinges 28, 29 at the end regions of the cross struts 26, 27 owing to the fact that the end regions of the cross struts 26, 27 are connected with the hinges in the form of the respective hinge mandrels (37) (FIG. 8). The cross struts 26, 27 and the hinge mandrels 37 constitute cross strut means.

The parallelogram hinges 28, 29, for their part, have in the region of the hinge mandrels 37 (FIG. 8) a holding plate 39, which is fixed to the cover 6 (not shown) for the storage well of the top and provided with a connecting lever 40, rising away from this holding plate 39 and having two control levers 41, 42, which are symmetrically disposed at the side. Between the control levers 41, 42, a traction lever 43, which is braced jointly with the two control levers 41, 42 pivotably at the rear 22 of the vehicle body at a bearing, is mounted at the connecting lever 40.

With a parallelogram hinge 16 of such construction, the aforementioned pivoting/pushing motion can be initiated on the cover 6 for the storage well with a high degree of guiding accuracy and a gentle stretching of the folding top 2 can be achieved with little effort in the locking position with the cover 6 for the storage well of the top.

Figure 9:
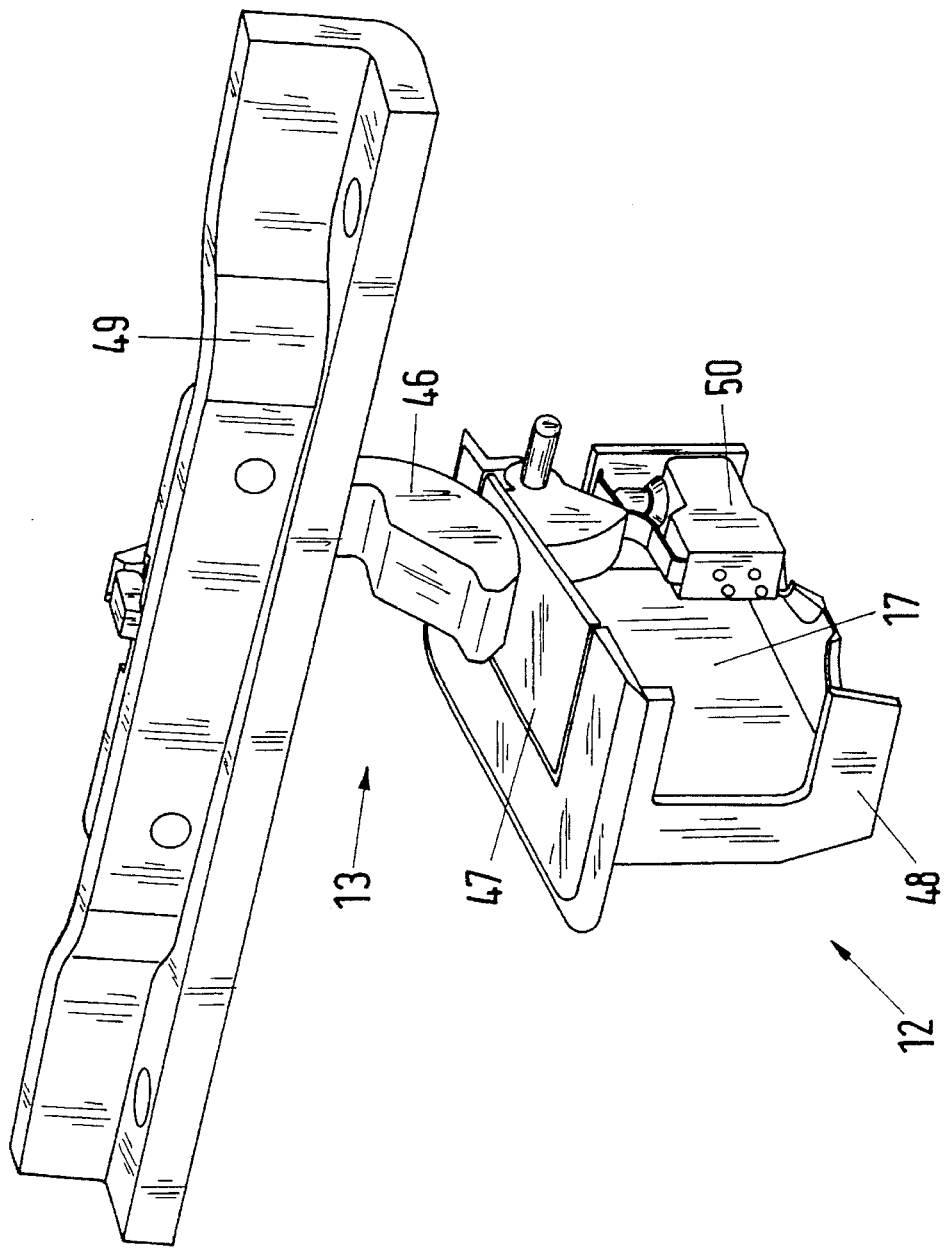
Figure 10:
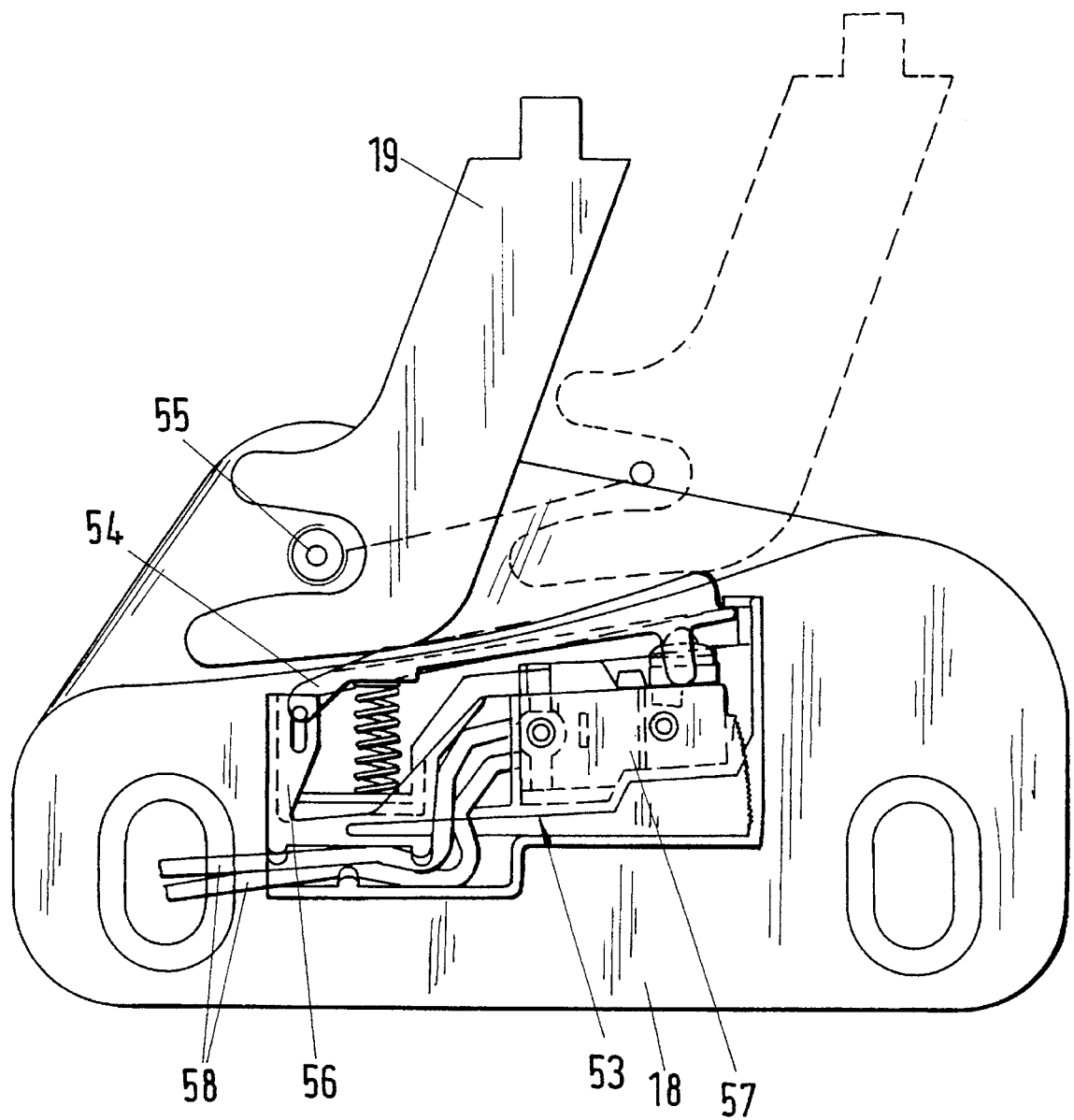

The enlarged, detailed representation of the locking equipment 12 of FIG. 9 illustrates that this equipment is constructed in an appropriate version as a locking well 48 accommodating the closing part 13, constructed as a locking hook 46, over a flap 47. The locking hook 46, supported over a bearing part 49 at the tightening clamp 8 (FIG. 5) for the material of the top, is pressed onto the flap 47 during the locking process and this flap 47, by approaching a microswitch 50, initiates a signal, which is fed back to the driving element 51 (in the form of a hydraulic cylinder) for the frame 7 of the top (FIG. 5) and so ends the closing process. FIG. 2 shows the locking position of the locking hook 46. As further shown in FIG. 9 the locking well 48 has an opening which is engaged by the locking hook 46 when in the locked position.

In addition to the aforementioned locking equipment 12, the cover 6 for the storage well of the top is provided with two catch hooks 19, which are shown in a detailed, enlarged representation in FIG. 9 and can be introduced into an appropriate anchoring bracket 18 in the side region of the rear of the vehicle (FIG. 5). The locking positions of the catch hook 19, shown by the broken lines, illustrate that this catch hook 19 is introduced into a connective engagement during the closing process of the cover 6 for the storage well of the top over a reed 54 having an electric contact maker 53 with a catching bolt 55 at the anchoring bracket 18. With that, the cover 6 for the storage well of the top is positioned in a securing position over the actuating equipment 15 or the locking equipment 12, which is in a functional relationship with this actuating equipment 15, as well as additionally over the catch hooks 19.

At the same time, a signal is generated over the reed 54 by means of an elastically supported adapter 56 in a microswitch 57 and stops the further motion during the closing process of the cover 6 for the storage well of the top or passes on an appropriate release signal over appropriate electrical connection lines 58 for the further control of the cover 6 for the storage well of the top during the opening process.

The retractable folding top operates as follows. With the top 7 up and the cover 6 closed, as shown in FIG. 2, if it is desired to retract the top into the storage well 10, the following sequence of events occur. Initially the actuating means 15 is actuated to move the cover 6 from its closed position (FIG. 1) to its open position (FIG. 3). The actuating means 15 is actuated by actuating the hydraulic cylinder 31 which is pivotably connected to the transmission lever 33 (FIG. 7), and which in turn, is operable to pivot the reversing lever 23 such that actuation of the hydraulic cylinder 31 effects pivoting of the reversing lever 23. Pivoting of the reversing lever 23 effects rotation of the cross struts 26, 27 because the thrust bolt 24a (FIG. 7) on the reversing lever 23 engages the groove 35a on the connecting element 25 which connects the cross struts 26, 27. The ends of the cross struts 26, 27 are connected to the parallel hinges by the respective hinge mandrels 37 (FIG. 8) such that rotation of the cross struts 26, 27 in turn, effects actuation of the parallel hinges.

The parallel hinges have a holding plate 39 (FIG. 8) fixed to the cover 6 and a plate 44 fixed to the vehicle. Thus the cover 6 is movably connected to the vehicle via the parallel hinges. Accordingly, when the cross struts 26, 27 are rotated upon actuation of the hydraulic cylinder 31, as previously described, the rotary motion of the cross struts 26, 27 is transferred to the parallel hinges via the hinge mandrel 37 which are on the ends of the cross struts 26, 27 and which are connected to the parallel hinges 28, 29. Thus the hydraulic cylinder 31 is operable to effect actuation of the parallel hinges so that actuation of the parallel hinges is operable to move the cover 6 between the closed position of FIG. 2, the intermediate position of FIG. 5 and the open position of FIG. 3.

Thus retraction of the top 7 is initiated by actuating the hydraulic cylinder 31 to effect movement of the cover 6 from its closed or locked position of FIG. 2 to the intermediate position of FIG. 5. When moving from the locked position of FIG. 2 to the intermediate position of FIG. 5, the engageable means 12, 13 are released, that is, the closing part 13 on the tightening clamp 8 of the top 7 is disengaged from the locking device 12 on the cover 6 as can be seen in FIG. 5. When the cover 6 moves from the locked position of FIG. 2 to the intermediate position of FIG. 5, the top 7 pivots about axis 7a from the fully closed position of FIG. 2 to the intermediate of FIG. 5 as the hydraulic cylinder 51 shortens. As hydraulic fluid is applied to the hydraulic cylinder 51 and the hydraulic cylinder 51 continues to shorten, the top 7 is further pivoted about axis 7a from the intermediate position of FIG. 5 to the up position of FIG. 3, bearing in mind that the top 7 is released from the cover 6 when the top 7 is in the intermediate position of FIG. 5 so that the top 7 is free to be pivoted to its up position of FIG. 3 by the hydraulic cylinder 51.

Pivoting of the top 7 to the up position of FIG. 3, clears the way for the cover 6 to be pivoted from the intermediate position of FIG. 5 to the fully open position of FIG. 3 by actuating the hydraulic cylinder 31 of the actuating means 15 as previously described. Accordingly, the cover 6 is now clear of the well 10, as shown in FIG. 3, so that the top 7 can now be fully retracted and disposed into the open well. Thereafter, the cover 6 is pivoted by the hydraulic cylinder 31 of the actuating means 15 to its closed position covering the well 10, the closed position being similar to the closed position shown in FIG. 2 but with the top 7 being retracted into the well 10.

When it is desired to put the top up, the reverse procedure is followed. Thus the cover 6 is first pivoted from its closed position to the up position shown in FIG. 3 by the hydraulic cylinder 31 of the actuating means 15 so that the cover 6 is free of the well 10. The top 7 is then withdrawn from the well 10 and disposed in the up position of FIG. 3 by the actuation of hydraulic cylinder 51. Thus the top 7 is clear of the well 10 so that the cover 6 can be pivoted from the up position of FIG. 3 to the intermediate position of FIG. 5. When the top 6 is in the intermediate position of FIG. 5, the cover 7 is pivoted from the up position of FIG. 3 to its intermediate position of FIG. 5. Thereafter further pivoting of the top 7 effects engagement of the engageable means 12, 13 in that the closing part 13 on the frame 8 of the top 7 is engaged by the locking device 12 on the cover 6 so that the top 7 and its frame 8 are locked onto the cover 6 as the cover 6 is moved to its final closed position of FIG. 2 by the hydraulic cylinder 31 of the actuating means 15.

What is claimed is:

1. A convertible top for a vehicle comprising a folding top frame having an unfolded position, a storage well in said vehicle, a cover, actuating means operably connected between said cover and said vehicle for moving said cover between a closed position and an open position, said cover when in said closed position covering said storage well, said cover when in said open position uncovering said storage well, and engageable means on said cover and said folding top frame operable to effect engagement between said cover and said folding top frame, said actuating means being operable to move said cover to said closed position as said engagement is effected between said cover and said folding top frame by said engageable means such that moving of said cover to said closed position by said actuating means effects tensioning of said folding top frame.

2. The convertible top for the vehicle according to claim 1 wherein said cover and said folding top frame each have an engageable position at which initial engagement is effected between said folding top frame and said cover by said engageable means, said cover when in said engageable position being displaced from its closed position, said unfolded position of said folding top frame being a locked position in which the folding top frame is tensioned and locked, said folding top frame when in said engageable position being displaced from said locked position.

3. The convertible top for the vehicle according to claim 2 wherein said actuating means is operable to move said cover from its engageable position to said closed position, said cover being operable to move said folding top frame from its engageable position to said locked position when said actuating means moves said cover from its engageable position to its closed position.

4. The convertible top for the vehicle according to claim 2 wherein said folding top frame comprises an elongated clamp member pivotably mounted on said vehicle, said elongated clamp member having an elongated part extending generally parallel to a longitudinal axis of the vehicle when said folding top frame is in said locked position, said clamp member having a rear end portion, said engageable means having a closing part disposed on said rear end portion, said convertible top having a foldable material disposed on said folding top frame, said foldable material having a rear end section secured to said rear end portion of said clamp member.

5. The convertible top for the vehicle according to claim 4 wherein said clamp member has a forward end portion, and pivot means pivotably mounting said forward end portion on said vehicle.

6. The convertible top for the vehicle according to claim 4 wherein said clamp member has first clamp means spaced from said closing part, said vehicle having second clamp means operable to engage said first clamp means when said cover is in said closed position.

7. The convertible top for the vehicle according to claim 6 further comprising a switch on said second clamp means, said first clamp means being operable to actuate said switch when said folding top frame is brought to its locked position by said cover.

8. The convertible top for the vehicle according to claim 6 wherein said first and second clamp means and said engageable means together secure and lock said cover in said closed position.

9. The convertible top for the vehicle according to claim 6 wherein said first and second clamp means and said engageable means are disposed in said storage well when said cover is in said closed position.

10. The convertible top for the vehicle according to claim 1 wherein said actuating means is operable to effect displacement of said cover in a generally horizontal direction as said actuating means moves said cover to said closed position.

11. The convertible top for the vehicle comprising a folding top frame having an unfolded position, a storage well in said vehicle, a cover, actuating means operably connected between said cover and said vehicle for moving said cover between a closed position and an open position, said cover when in said closed position covering said storage well, said cover when in said open position uncovering said storage well, and engageable means on said cover and said folding top frame operable to effect engagement between said cover and said folding top frame, said actuating means being operable to move said cover to said closed position as said engagement is effected between said cover and said folding top frame by said engageable means such that moving of said cover to said closed position by said actuating means effects tensioning of said folding top frame, said cover and said folding top frame each having an engageable position at which initial engagement is effected between said folding top frame and said cover by said engageable means, said cover when in said engageable position being displaced from its closed position, said unfolded position of said folding top frame being a locked position in which the folding top frame is tensioned and locked, said folding top frame when in said engageable position being displaced from said locked position, said actuating means comprising parallelogram hinges between said cover and said vehicle, said actuating means being operable to effect movement of said cover from said engageable position to said closed position, said cover when being moved from said engageable position to said closed position traversing a non-circular path.

12. The convertible top for the vehicle according to claim 11 wherein said actuating means comprises a pivotal reversing lever pivotal on said vehicle about an axis parallel to a longitudinal axis of said vehicle, elongated cross struts mounted on said cover having elongate axes extending perpendicular to the longitudinal axis of the vehicle, and sliding means interposed between said reversing lever and said cross struts such that pivoting of said reversing lever imparts a rotary motion to said cross struts.

13. The convertible top for the vehicle according to claim 12 wherein said cross struts extend to said parallelogram hinges.

14. The convertible top for the vehicle according to claim 12 further comprising power means mounted on said vehicle for effecting pivoting of said reversing lever.

15. The convertible top for the vehicle according to claim 12 wherein each of said parallelogram hinges comprises a connecting lever pivotably mounted on said cover, said connecting lever having an end portion and an intermediate portion, a pair of spaced control levers pivotably mounted on said intermediate portion of said connecting lever, a traction lever located between said spaced control levers and pivotably mounted on said end portions of said connecting lever, pivot means pivotably mounting said control levers on said vehicle, and pivoting means pivotably mounting said traction lever on said vehicle.

16. The convertible top for the vehicle according to claim 12 wherein said engageable means comprises a locking well in said cover, said locking well having a locking well opening on which a locking well flap is disposed, said engageable means further comprising a locking hook on said folding top frame operable to engage and open said locking well flap to provide for entry of said locking hook into said locking well.

17. The convertible top for the vehicle according to claim 16 wherein said engageable means further comprises a switch which is actuated when said locking hook enters said locking well.

18. The convertible top for the vehicle according to claim 17 wherein said switch is actuated by said locking well flap.

19. The convertible top for the vehicle according to claim 16 wherein said engageable means further comprises locking means on said cover and engaged by said locking hook when said locking hook is disposed in said locking well.

20. The convertible top for the vehicle according to claim 12 further comprising wire means connected to said reversing lever to effect pivoting of said reversing lever.

21. A convertible top for a vehicle comprising a folding top frame having an unfolded position, a storage well in said vehicle, a cover, actuating means operably connected between said cover and said vehicle for moving said cover between a closed position and an open position, said cover when in said closed position covering said storage well, said cover when in said open position uncovering said storage well, and engageable means on said cover and said folding top frame operable to effect engagement between said cover and said folding top frame, said actuating means being operable to move said cover to said closed position as said engagement is effected between said cover and said folding top frame by said engageable means such that moving of said cover to said closed position by said actuating means effects tensioning of said folding top frame, said actuating means comprising a reversing lever pivotably mounted on said vehicle about an axis parallel to a longitudinal axis of said vehicle, said actuating means further comprising a cross strut mounted on said cover, said cross strut having a helical-like groove, said reversing lever having a thrust pin disposed in said groove such that pivoting of said reversing lever rotates said gross strut.

22. The convertible top for the vehicle according to claim 21 wherein said strut means comprises elongated strut members having their elongate axes extending perpendicular to the longitudinal axis of said vehicle.

23. The convertible top for the vehicle according to claim 21 further comprising a transmission member pivotal about an axis parallel to the longitudinal axis of said vehicle, a stop on said reversing lever, and actuating means connected to said transmission lever to effect pivoting of said transmission lever, said transmission lever engaging said stop to effect pivoting of said reversing lever.

* * * * *